United States Patent
Yoon

(10) Patent No.: US 7,272,827 B2
(45) Date of Patent: Sep. 18, 2007

(54) STATICALLY DETECTING EXTERNALLY REFERENCED INTERFACES OF A PROGRAM

(75) Inventor: Young-Jun Yoon, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 10/115,508

(22) Filed: Apr. 3, 2002

(65) Prior Publication Data

US 2003/0192037 A1  Oct. 9, 2003

(51) Int. Cl.
*G06F 9/44* (2006.01)

(52) U.S. Cl. .................... 717/133; 717/126

(58) Field of Classification Search .............. 717/126, 717/162, 163, 164, 165, 154, 155, 156, 157, 717/158, 159, 144, 133
See application file for complete search history.

(56) References Cited

U.S. PATENT DOCUMENTS

| | | | | |
|---|---|---|---|---|
| 5,560,010 A * | 9/1996 | Albert | 717/108 |
| 5,651,111 A * | 7/1997 | McKeeman et al. | 714/38 |
| 5,659,751 A * | 8/1997 | Heninger | 719/332 |
| 5,659,753 A * | 8/1997 | Murphy et al. | 717/147 |
| 5,923,880 A * | 7/1999 | Rose et al. | 717/145 |
| 5,943,496 A | 8/1999 | Li et al. | 395/685 |
| 6,011,916 A | 1/2000 | Moore et al. | 395/701 |
| 6,029,207 A * | 2/2000 | Heninger | 719/331 |
| 6,061,520 A | 5/2000 | Yellin et al. | 395/705 |
| 6,074,432 A | 6/2000 | Guccione | 717/2 |
| 6,081,665 A | 6/2000 | Nilsen et al. | 395/705 |
| 6,110,226 A | 8/2000 | Bothner | 717/7 |
| 6,138,170 A * | 10/2000 | Matheson | 719/318 |
| 6,158,048 A | 12/2000 | Lueh et al. | 717/9 |
| 6,182,277 B1 * | 1/2001 | DeGroot et al. | 717/115 |
| 6,192,516 B1 | 2/2001 | Griesemer | 717/9 |
| 6,205,578 B1 | 3/2001 | Grove | 717/5 |
| 6,219,835 B1 * | 4/2001 | House | 717/114 |
| 6,223,346 B1 | 4/2001 | Tock | 717/11 |
| 6,230,312 B1 * | 5/2001 | Hunt | 717/108 |
| 6,247,171 B1 | 6/2001 | Yellin et al. | 717/4 |
| 6,278,960 B1 | 8/2001 | De Groot | 702/188 |
| 6,282,698 B1 | 8/2001 | Baker et al. | 717/1 |
| 6,343,287 B1 * | 1/2002 | Kumar et al. | 707/4 |

(Continued)

FOREIGN PATENT DOCUMENTS

EP  0974897  1/2000

(Continued)

OTHER PUBLICATIONS

Core JAVA 2 vol. II—Advanced Features, Cay S. Horstmann et al, pp. 298-317, 1999.*

(Continued)

*Primary Examiner*—Todd Ingberg
(74) *Attorney, Agent, or Firm*—Heslin Rothenberg Farley & Mesiti P.C.

(57) ABSTRACT

Externally referenced interfaces of a program are statically detected. The static detection of the externally referenced interfaces is performed prior to runtime and without the source code of the program. Input to the static detection is the compiled output of the program, and the output is a list of the externally referenced interfaces of the program.

44 Claims, 3 Drawing Sheets

U.S. PATENT DOCUMENTS

| | | | | |
|---|---|---|---|---|
| 6,385,722 | B1* | 5/2002 | Connelly et al. | 713/2 |
| 6,499,137 | B1* | 12/2002 | Hunt | 717/164 |
| 6,505,344 | B1* | 1/2003 | Blais et al. | 717/151 |
| 6,507,857 | B1* | 1/2003 | Yalcinalp | 715/513 |
| 6,546,433 | B1* | 4/2003 | Matheson | 719/318 |
| 6,546,553 | B1* | 4/2003 | Hunt | 717/174 |
| 6,584,491 | B1* | 6/2003 | Niemi et al. | 709/202 |
| 6,584,507 | B1* | 6/2003 | Bradley et al. | 709/229 |
| 6,601,233 | B1* | 7/2003 | Underwood | 717/102 |
| 6,609,130 | B1* | 8/2003 | Saulpaugh et al. | 707/102 |
| 6,615,342 | B1* | 9/2003 | Bopardikar et al. | 712/227 |
| 6,651,080 | B1* | 11/2003 | Liang et al. | 718/1 |
| 6,654,953 | B1* | 11/2003 | Beaumont et al. | 717/158 |
| 6,665,865 | B1* | 12/2003 | Ruf | 717/157 |
| 6,681,385 | B1* | 1/2004 | Steensgaard et al. | 717/133 |
| 6,725,451 | B1* | 4/2004 | Schuetz et al. | 717/151 |
| 6,728,716 | B1* | 4/2004 | Bhattacharya et al. | 707/10 |
| 6,769,001 | B2* | 7/2004 | Halstead et al. | 707/103 R |
| 6,788,317 | B2* | 9/2004 | Gardas et al. | 715/762 |
| 6,859,810 | B2* | 2/2005 | Andrei et al. | 707/102 |
| 6,901,588 | B1* | 5/2005 | Krapf et al. | 717/164 |
| 7,058,943 | B2* | 6/2006 | Blais et al. | 718/1 |
| 7,120,908 | B1* | 10/2006 | Klimchynski | 717/165 |

FOREIGN PATENT DOCUMENTS

| | | |
|---|---|---|
| JP | 10091446 | 7/1997 |
| JP | 02000181724 A | 6/2000 |
| JP | 2000200182 | 6/2000 |
| WO | WO9837486 | 2/1997 |
| WO | WO 0038073 | 11/1999 |
| WO | WO9949392 | 11/1999 |

OTHER PUBLICATIONS

"Efficient Polymorphic Calls", Karel Driesen, 2001, pp. 9-10.*
"Generation of Compiler Symbol Processing Mechanisms from Specifications", Stephen P. Reiss, ACM, Apr. 1983, pp. 127-163.*
"Communications between independently translated blocks",Peter Wegner, ACM, Jul. 1962, pp. 376-381.*
"The Design of a Space Efficient Compiler", Michael K Donegan, Aug. 1978, ACM, pp. 62-70.*
"Linkers and Loaders", Leon Presser et al, Sep. 1972, ACM, pp. 149-167.*
"Distributed Shared Library" Herman C. Rao et al., ACM 1992, pp. 1-5.*
"Proof-Linking:Modular Verification of Mobile Programs in the Presence of Lazy Dynamic Linking", Philip W.L. Fong et al, ACM, Oct. 2000, pp. 379-409.*
"A Specification of Java Loading and Bytecode Verification", Allen Goldberg ACM, 1998, pp. 49-58.*
"Linkers & Loaders", John R. Levine , Oct. 11, 1999, pp. 71-92, 117-129, 144- 145, 216-222.*
The JAVA Virtual Macnije Specification Second Edition, Tim Lindolm et al, published Apr. 22, 1999. pp. 155-170.*
Microsoft Press Computer Dictionary third Edition, Aug. 19, 1997, p. 166.*
IBM Dictionary of Computing, IBM, 1994, p. 225.*
Beginning Visual C++ 5, Ivan Horton, Mar. 19, 1997, pp. 715-734.*
Linkers & Loaders, John R. Levine, Oct. 11, 1999, pp. 117-129.*
WRL Technical Note TN-19 System for Late Code Modification, David W. Wall, DEC, Jun. 1991, 19 pages.*
Program Analysis Alleviates Java Synchronization, Jeffrey George Bogda, University of California Santa Barbara, Dec. 2001, 169 pages.*
JAVA!, Tim Richey, New Riders Publishing, Sep. 22, 1995, pp. 1-54, 125-187, 305-346.*
Removing Unnecessary Synchronization in Java, Jeff Bogda et al, ACM, 1999, pp. 35-46.*
Program Analysis Alleviated Java Synchronization, J.G. Bogda, UCSB, 2001, 11 pages.*
"Help Java class to read parameters defined in external files has Java clas which wants to get parameters in HTML file, establish client socket connection with applet", International Business Machines Corporation, RD-437121.
"Debugging JITted Java Code", E.J. Hilpert, Jr., R.C. Blaisdell, RD v 42 n420 Apr. 1999 article 42092.
"Java Dynamic Class Loader", IBM Technical Disclosure Bulletin, vol. 39, No. 11, Nov. 1996, pp. 107-108.

* cited by examiner

US 7,272,827 B2

STATICALLY DETECTING EXTERNALLY REFERENCED INTERFACES OF A PROGRAM

TECHNICAL FIELD

This invention relates, in general, to processing computer programs, and in particular, to statically detecting externally referenced interfaces of a computer program, prior to runtime.

BACKGROUND OF THE INVENTION

Typically, there are various processing stages associated with creating and executing a computer program. For example, the source code of a program is written in a programming language of choice by a programmer. The source code is then compiled by a compiler or interpreted by an interpreter compatible with the programming language of the program to generate machine code. The machine code is then loaded onto a particular platform designed to run the machine code, and the machine code is executed.

With some programming languages, the processing stages described above are slightly modified. For instance, with the JAVA programming language, the stages are modified to allow a write once, run anywhere environment. To provide such an environment, the JAVA source code is both compiled and interpreted. In particular, the JAVA compiler compiles the code and generates an intermediate language, referred to as the JAVA byte codes. The byte codes, which are packaged in a *.class file, are then interpreted and executed on a computer that is equipped with a JAVA Virtual Machine.

In order to successfully run a program, the program needs access to any externally referenced interfaces of the program. If the program does not have access to one or more of its interfaces, then during execution, the program receives a runtime error, such as JAVA.lang.NoClassDefFoundError for JAVA programs. If an error is indicated, the appropriate interface is supplied, and the program is run again. This process is repeated until no more errors are received.

The above procedure eventually determines whether the appropriate interfaces are packaged with the program, but such a procedure requires the program to be run in a runtime environment, possibly multiple times, and tends to be time consuming. Thus, a need exists for an enhanced capability for detecting externally referenced interfaces. In particular, a need exists for a capability that detects externally referenced interfaces prior to executing the program at runtime.

SUMMARY OF THE INVENTION

The shortcomings of the prior art are overcome and additional advantages are provided through the provision of a method of facilitating detection of externally referenced interfaces of a program. The method includes, for instance, obtaining a program for which one or more externally referenced interfaces of the program are to be detected; and detecting the one or more externally referenced interfaces without having to execute the program during runtime.

In one aspect of the present invention, a capability is provided for facilitating detection of externally referenced interfaces of a program. The detection is performed statically in that the source code and/or a runtime environment are not needed. Instead, the byte codes produced during compilation of the program are used in detecting the externally referenced interfaces.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided for statically detecting externally referenced interfaces (e.g., classes, functions, application programming interfaces, etc.) of a program. The detection is performed statically in that the program does not need to be run in a runtime environment to determine the externally referenced interfaces, and the program's source code is not needed for the detection. The detection capability can be implemented in various different programming languages and executed on different computing platforms. As one example, the detection capability is implemented in the JAVA programming language and run on a computer supporting the JAVA Virtual Machine (JVM). However, this is only one example.

The detection capability of an aspect of the present invention receives as input the output of a compiled program and produces as its output a list of externally referenced interfaces of the program. This processing is described further with reference to FIG. 1. Since the examples presented herein are with reference to the JAVA programming language, the output of the compiled program is a class file and the interfaces include classes. However, these are only examples.

Figure 1:
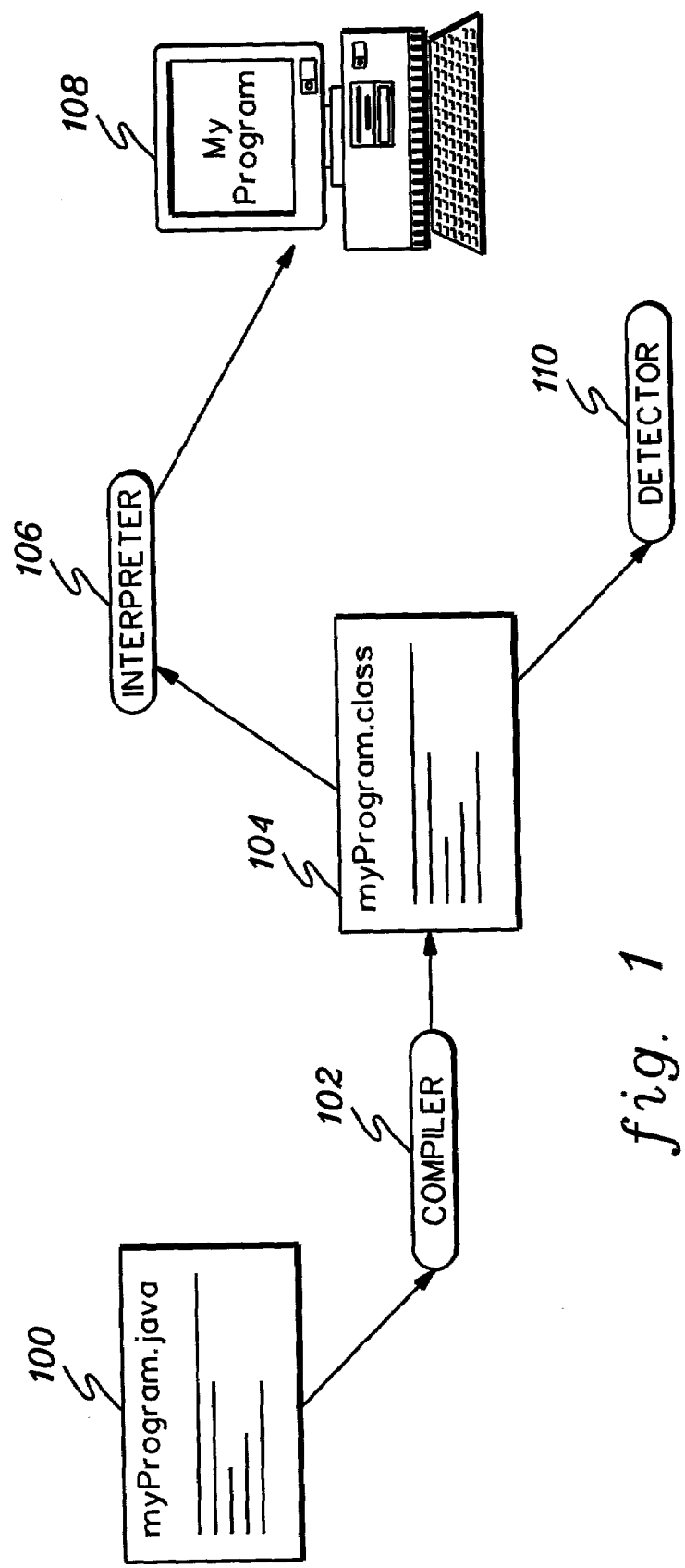
FIG. 1 depicts one embodiment of various processing stages associated with a program, including a detection stage in which a list of one or more externally referenced interfaces of a program is produced, in accordance with an aspect of the present invention.

Referring to FIG. 1, initially, a program 100, referred to as myProgram.JAVA, is written by a programmer in the JAVA programming language. As one example, the program is an Enterprise JAVABean Application. The program is then compiled using a compiler 102 producing a compiled output 104, referred to as myProgram.class. MyProgram.class is a class file tat includes a set of byte codes representing the program. The set of byte codes is then input to an interpreter 106, since the program is written in JAVA, and the interpreter interprets the byte codes. The interpreted byte codes are then executed on a computer 108. In one example, computer 108 includes a J2EE Application Server executing a JAVA Virtual Machine (JVM).

In accordance with an aspect of the present invention, the output of the compiler, myProgram.class, is also input to a detector 110, which processes the byte codes of myProgram-.class and produces a list of externally referenced interfaces of the program. The list indicates the externally referenced interfaces of the program that are to be packaged with the program or otherwise made available to the program for proper execution of the program. In one example, the detection is performed during J2EE Application Assembly to make available the list during assembly of the program package, and prior to runtime of the program.

Detector 110 can be run on the same computer that performs one or more other processing phases of the program or on a separate computer. The detector (or detection capability) is portable and does not need the source code of the program or the runtime environment of the program. Further, the detector does not need to be implemented in the same programming language as the program.

Prior to describing how the detector is implemented, further details associated with the input of the detector are described. In particular, one example of the structure of a class file, which is input to the detector, is described. In this example, the structure of the class file is based on the format of a class file documented in The JAVA Virtual Machine Specification, by Tim Lindholm and Frank Yellin, (Addison-Wesley, 1999), (ISBN 0-201-63452-X), which is hereby incorporated herein by reference in its entirety. However, in other embodiments, the class file can be based on other formats.

A class file includes, for instance, a stream of 8-bit bytes, and has a root structure representing those bytes. One example of a root structure for a class file is depicted below:

```
ClassFile {
    u4 magic;
    u2 minor_version;
    u2 major_version;
    u2 constant_pool_count;
    cp_info constant_pool[constant_pool_count-1];
    u2 access_flags;
    u2 this_class;
    u2 super_class;
    u2 interfaces_count;
    u2 interfaces[interfaces_count];
    u2 fields_count;
    field_info fields[fields_count];
    u2 methods_count;
    method_info methods[methods_count];
    u2 attributes_count;
    attribute_info attributes[attributes_count];
}
, where (u2 == two 8-bit bytes && u4 == four 8-bit bytes).
```

As shown, the class file includes a plurality of structures. In one instance, in order to determine the externally referenced classes of the class file, one or more of the structures are examined. Through this examination, which is further described below, it is determined that the fully qualified name of each class referenced within the class file is stored as a string in a modified Utf-8 format within a structure of the class file. For example, the class names are stored within the cp_info (constant_pool's general format) structure of the class file.

In particular, as one example, the cp_info structure includes a plurality of substructures, and the actual fully qualified class names are located within one of the substructures, referred to as the CONSTANT_Utf8_info substructure, of the cp_info structure. One example of this substructure, as well as other substructures of the cp_info structure are as follows:

```
cp_info {
    u1 tag;              //Constant Pool Tag Type
    u1 info;             //General reference pointer to its
                         //info content
}
CONSTANT_Utf8_info {
    u1 tag;              //0x01
    u2 length;           //number of bytes in the bytes array
                         //attribute below
    u1 bytes [length];   //modified Utf-8 string
}
CONSTANT_Class {
    u1 tag;              //0x07
    u2 name_index;       //index of CONSTANT_Utf8_info that
                         //contains fully qualified name of
                         //an interface (e.g., class)
}
CONSTANT_NameAndType }
    u1 tag;              //0x0C
    u2 name_index;       //index of CONSTANT_Utf8_info that
                         //gives the name of the field or
                         //method
    u2 descriptor_index; //index of CONSTANT_Utf8_info that
                         //gives the descriptor of the field or
                         //method
}.
```

A cp_info structure can include zero or more of each of the above-described substructures, depending on the program. Typically, in one example, the cp_info structure includes a plurality of CONSTANT_Utf8_info substructures, each being referenced by another substructure of cp_info or other structures of the class file, as described herein. Thus, although the externally referenced class names are stored within CONSTANT_Utf8_info substructures of the constant_pool array attribute, detection logic is employed to determine which instance of the substructure, and moreover, which substring within a particular instance, represents the interested fully qualified class name of an externally referenced class.

The detection logic of an aspect of the present invention receives as input the output of the compiler and outputs a list of externally referenced interfaces of the class file (i.e., the program). One embodiment of the detection logic associated with statically detecting the externally referenced interfaces of a program is described with reference to FIGS. 2a-2b.

Figure 2A:
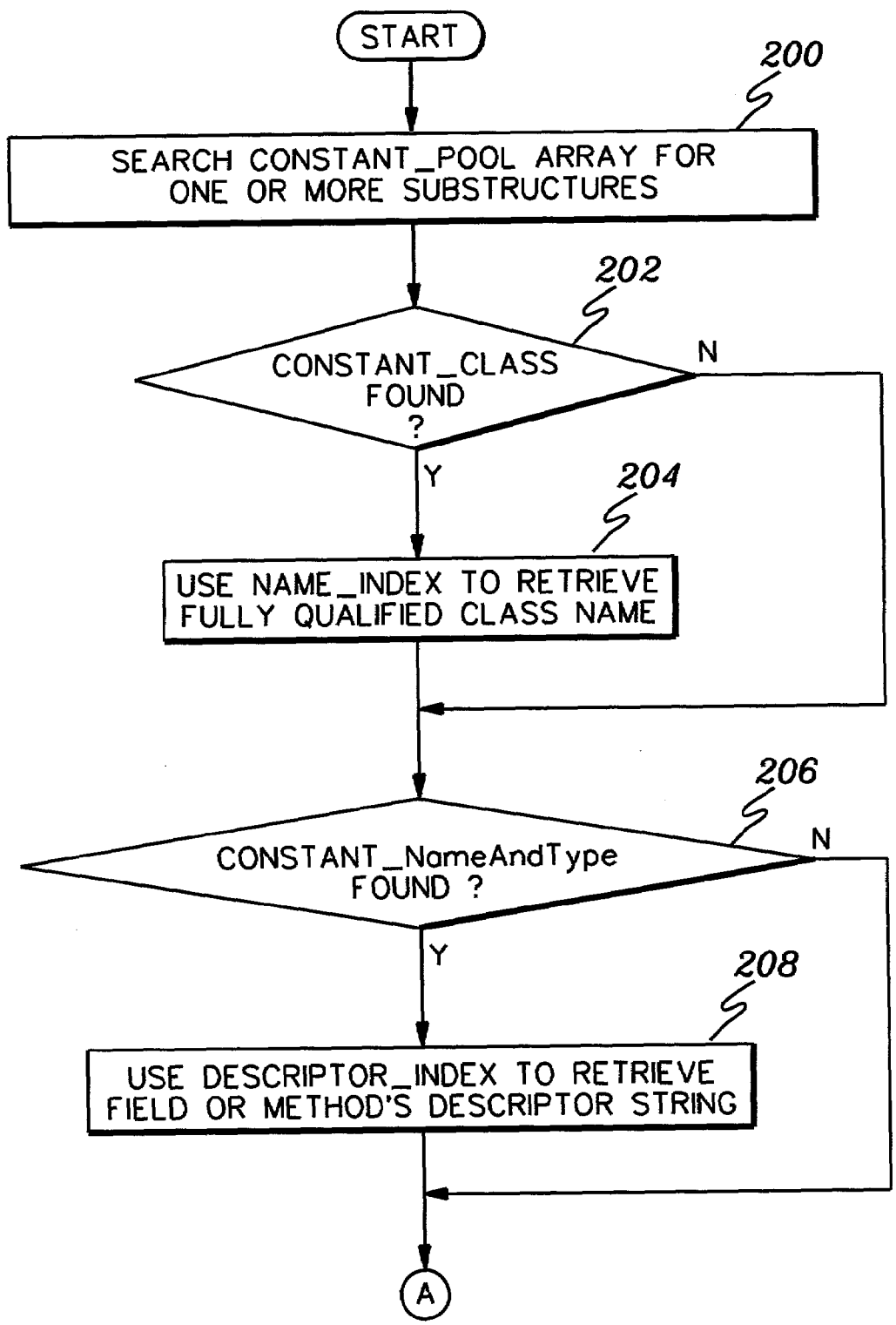
FIGS. 2a-2b depict one embodiment of the logic associated with detecting one or more externally referenced interfaces of a program, in accordance with an aspect of the present invention.

Referring to FIG. 2a, initially, the externally referenced interfaces of this_class or the super_class are detected. The interfaces include, for instance, application programming interfaces, local variables, exceptions within this class file's byte codes, etc. To accomplish this, the logic begins with searching the constant_pool array of the class file for one or more substructures, such as one or more CONSTANT_Class substructures, STEP 200. For each CONSTANT_Class substructure that is found, INQUIRY 202, the name_index of CONSTANT_Class is used to obtain the index of a CONSTANT_Utf8_info substructure, in order to retrieve the fully qualified class name from the designated CONSTANT_Utf8_info substructure, STEP 204. As one example, the class name, separated by "/", is included in the CONSTANT_Utf8_info substructure.

Subsequent to retrieving one or more fully qualified class names, or if CONSTANT_Class was not found, the logic continues with detecting externally referenced interfaces embedded within fields or methods referenced within this_ class's method body. For example, a determination is made as to whether one or more CONSTANT_NameAndType substructures were located during the search of STEP 200, INQUIRY 206. For each CONSTANT_NameAndType substructure that is found, the descriptor_index of the selected CONSTANT_NameAndType substructure is used to obtain the index of a CONSTANT_Utf8_info substructure, in order to retrieve therefrom a descriptor string of a field or method of this class, STEP 208.

Examples of descriptor strings are depicted below:

| Case 1 | (field == myField) : | | |
|---|---|---|---|
| | source code | --> | (String) myVar.myField; |
| | descriptor string | --> | "Ljava/lang/String"; |
| Case 2 | (method == myMethod) : | | |
| | source code | --> | Object myMethod (int i, double d, Thread[] ta); |
| | descriptor string | --> | "(ID[Ljava/lang/Thread;)Ljava/lang/Object;" |

Figure 2B:
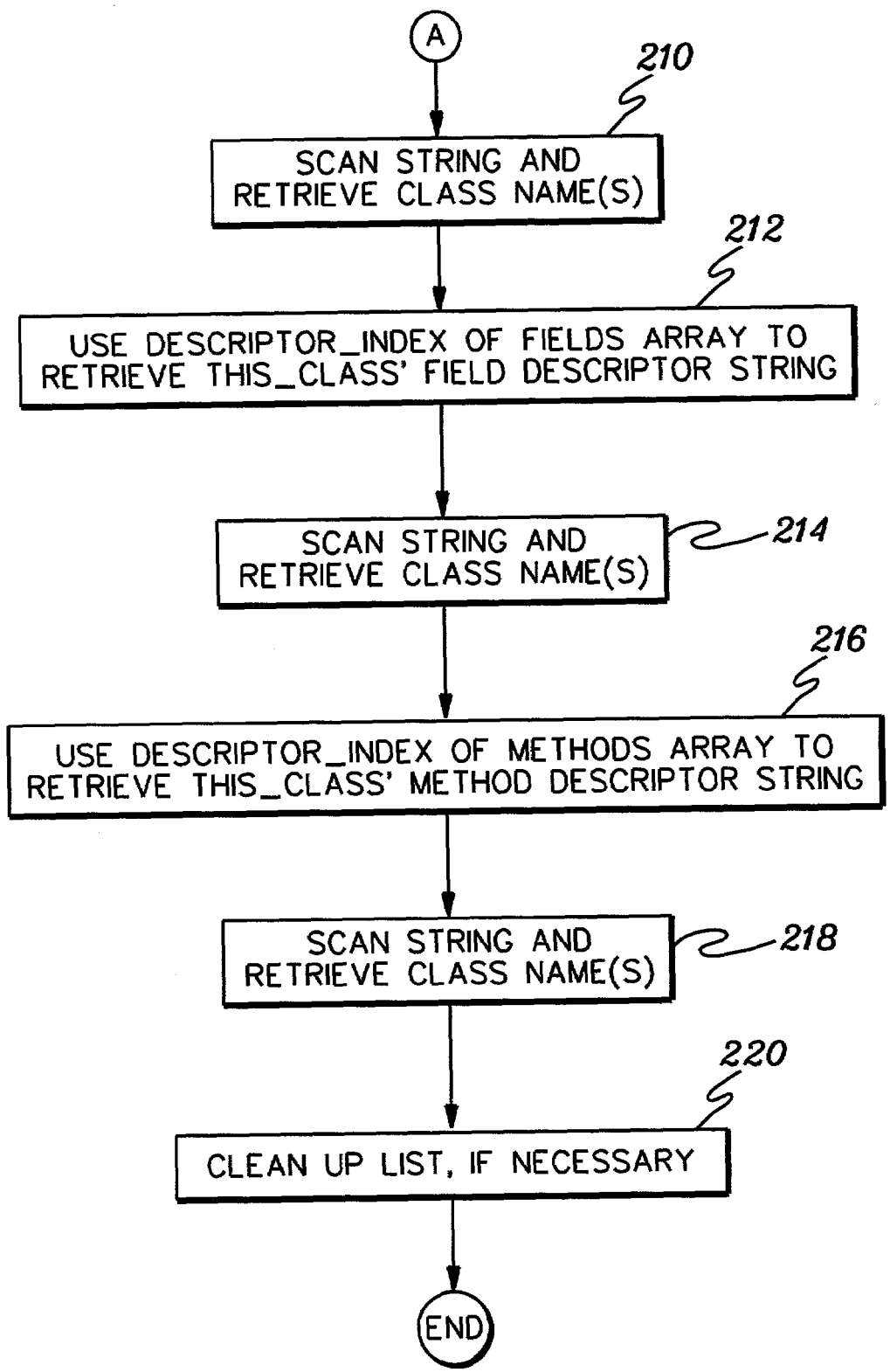

The descriptor string is retrieved from the specified CONSTANT_Utf8-info substructure, and the string is scanned for one or more fully qualified class names to be extracted therefrom, STEP 210 (FIG. 2b). As one example, the string is searched for "L" beginning a phrase and ";" ending the phrase. Thus, in Case 1, the class name "JAVA.lang.String" is extracted; and in Case 2, the class names "JAVA.lang.Thread" and "JAVA.lang.Object" are extracted.

Subsequent to searching the one or more CONSTANT_NameAndType substructures, or if CONSTANT_NameAndType was not found, a fields structure of the class file (e.g., field_info array) is searched to locate one or more class references embedded within the fields of this_class. One example of the structure of a field_info array is as follows:

```
field_info {
    u2 access_flags;
    u2 name_index;          //index of CONSTANT_Utf8_info
                            //that gives simple name of this
                            //field
    u2 descriptor_index;    //index of CONSTANT_Utf8_info
                            //that gives the descriptor of
                            //this field
    u2 attributes_count;    //number of attribute_info
                            //tables
    attributes_info attributes;  //ConstantValue or Synthetic type
}.
```

The descriptor_index of the field_info array is used to obtain the index of a CONSTANT_Utf8_info substructure, in order to retrieve therefrom a field descriptor string of this_class, STEP 212. The descriptor string is retrieved from the CONSTANT_Utf8_info substructure, and the string is scanned for one or more fully qualified class names to be extracted therefrom, as described above, STEP 214.

Similarly, a methods structure of the class file (e.g., method_info array) is searched to locate one or more class references embedded within the methods of this_class. One example of the structure of a method_info array is as follows:

```
method_info {
    u2 access_flags;
    u2 name index;          //index of CONSTANT Utf8_info
                            //that gives simple name of this
                            //field
    u2 descriptor_index;    //index of CONSTANT_Utf8_info
                            //that gives the descriptor of
                            //this field
```

-continued

```
    u2 attributes_count;    //number of attribute_info
                            //tables
    attributes_info attributes;  //Code, Exceptions, or Synthetic
                                 //type
}.
```

The descriptor_index of the method_info array is used to obtain the index of a CONSTANT_Uf8_info substructure, in order to retrieve a method descriptor string of this_class, STEP 216. The descriptor string is retrieved from the CONSTANT_Utf8_info substructure, and the string is scanned for one or more fully classified qualified class names to be extracted therefrom, as described above, STEP 218.

After performing the processing associated with the methods array, the list of externally referenced interfaces for the class file is complete. However, at this time, the list is cleaned up, if necessary, STEP 220. For instance, any duplicate classes are removed from the list. Further, it is ensured that the list does not contain the name of this_class.

As one example, the detection logic is performed for each class file of the compiled output. In other examples, however, if there are multiple class files generated by the compiler, one or more of the class files are subjected to the detection logic.

Further, in one embodiment, the detection logic is recursively executed to detect the externally referenced interfaces of the already detected interfaces. That is, the logic is re-executed to ensure that the list includes the externally referenced interfaces of the interfaces included within the list. In another embodiment, however, the logic is not recursively executed, as the list provided by the initial pass through the logic is considered satisfactory.

Described in detail above is a capability for statically detecting externally referenced interfaces of a program. The program is obtained (e.g., created, provided, received, have), and the static detection capability of an aspect of the present invention advantageously provides the externally referenced interfaces of the program without requiring the source code and/or use of a runtime environment.

In one example, one or more aspects of the invention are used for portable and self-contained Enterprise JAVA Bean (EJB) classes in the JAVA 2 Platform Enterprise Edition (J2EE) application server environment. In one example, the application server is a WebSphere application server. Aspects of the invention can be used during J2EE application assembly to determine the necessary jar/zip/classes required to be packaged for an Enterprise JAVA Bean application in order to avoid runtime problems. These runtime problems are not only hard to detect, but also could result in recursive re-deployment of J2EE applications, which is time consuming for the application deployer, as well as for the Container provider for the service.

Although the examples provided herein are with reference to JAVA, these are only examples. Aspects of the invention are applicable to other object-oriented languages, such as C, C++, etc. It will be understood that for some languages, such as C and C++, the interpretation processing stage is not needed. Further, it will be understood that for other languages, the output of the compiler may be other than a class file, such as another type of file or other structure.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating detection of externally referenced interfaces of a program, said method comprising:

obtaining a compiled program for which one or more externally referenced interfaces in the compiled program are to be detected;

detecting the one or more externally referenced interfaces in the compiled program without having to execute the compiled program during runtime;

creating a list of at least one of the one or more externally referenced interfaces in response to the detecting; and storing the list in a computer-readable medium.

2. The method of claim 1, wherein said compiled program comprises byte codes of said program, and wherein said detecting comprises using data of said byte codes to detect the one or more externally referenced interfaces.

3. The method of claim 2, wherein one or more designations of the one or more externally referenced interfaces are included in the byte codes.

4. The method of claim 1, wherein said compiled program comprises one or more class files of said program, and wherein said detecting comprises using data of at least one class file of said one or more class files to detect the one or more externally referenced interfaces.

5. The method of claim 4, wherein a class file of said at least one class file comprises one or more structures, and wherein said using comprises using data of at least one structure of the one or more structures to detect at least one externally referenced interface of the one or more externally referenced interfaces.

6. The method of claim 5, wherein at least one designation of the at least one externally referenced interface is located in a structure of the one or more structures.

7. The method of claim 5, wherein said at least one structure comprises at least one substructure, and wherein said data comprises at least one index of said at least one substructure indicating at least one other substructure of said class file that includes at least one designation of at least one externally referenced interface.

8. The method of claim 5, wherein a structure of said at least one structure comprises a constant pool structure, and wherein said data comprises an index of a CONSTANT_Class substructure of said constant pool structure indicating another substructure of said constant pool structure that includes at least one designation of at least one externally referenced interface.

9. The method of claim 5, wherein said at least one structure comprises a constant pool structure, and wherein said data comprises an index of a CONSTANT_NameAndType substructure of said constant pool structure indicating another substructure of said constant pool structure that includes at least one designation of at least one externally referenced interface.

10. The method of claim 5, wherein a structure of said at least one structure comprises a field_info structure, and wherein said data comprises an index of said field_info structure indicating another substructure of said class file that includes at least one designation of at least one externally referenced interface.

11. The method of claim 5, wherein a structure of said at least one structure comprises a method_info structure, and wherein said data comprises an index of said method_info structure indicating another substructure of said class file that includes at least one designation of at least one externally referenced interface.

12. The method of claim 1, wherein said creating comprises creating a list of the one or more externally referenced interfaces, said list usable in packaging the program to be run during runtime.

13. The method of claim 1, wherein said program is written in a predetermined object-oriented programming language, and wherein said one or more externally referenced interfaces comprise one or more externally referenced classes.

14. The method of claim 1, wherein the detecting comprises detecting all externally referenced interfaces in the compiled program without having to execute the compiled program during runtime.

15. A computer-implemented system of facilitating detection of externally referenced interfaces of a program, said system comprising:

a compiled program in which one or more externally referenced interfaces in the compiled program are to be detected;

means for detecting the one or more externally referenced interfaces in the compiled program without having to execute the program during runtime;

means for creating a list of at least one of the one or more externally referenced interfaces in response to the detecting; and a computer-readable medium for storing the list.

16. The system of claim 15, wherein said compiled program comprises byte codes of said program, and wherein said means for detecting comprises means for using data of said byte codes to detect the one or more externally referenced interfaces.

17. The system of claim 16, wherein one or more designations of the one or more externally referenced interfaces are included in the byte codes.

18. The system of claim 15, wherein said compiled program comprises one or more class files of said program, and wherein said means for detecting comprises means for using data of at least one class file of said one or more class files to detect the one or more externally referenced interfaces.

19. The system of claim 18, wherein a class file of said at least one class file comprises one or more structures, and wherein said means for using comprises means for using data of at least one structure of the one or more structures to detect at least one externally referenced interface of the one or more externally referenced interfaces.

20. The system of claim 19, wherein at least one designation of the at least one externally referenced interface is located in a structure of the one or more structures.

21. The system of claim 19, wherein said at least one structure comprises at least one substructure, and wherein said data comprises at least one index of said at least one substructure indicating at least one other substructure of said class file that includes at least one designation of at least one externally referenced interface.

22. The system of claim 19, wherein a structure of said at least one structure comprises a constant pool structure, and wherein said data comprises an index of a CONSTANT_Class substructure of said constant pool structure indicating another substructure of said constant pool structure that includes at least one designation of at least one externally referenced interface.

23. The system of claim 19, wherein said at least one structure comprises a constant pool structure, and wherein said data comprises an index of a CONSTANT_NameAndType substructure of said constant pool structure indicating another substructure of said constant pool structure that includes at least one designation of at least one externally referenced interface.

24. The system of claim 19, wherein a structure of said at least one structure comprises a field_info structure, and wherein said data comprises an index of said field_info structure indicating another substructure of said class file that includes at least one designation of at least one externally referenced interface.

25. The system of claim 19, wherein a structure of said at least one structure comprises a method_info structure, and wherein said data comprises an index of said method_info structure indicating another substructure of said class file that includes at least one designation of at least one externally referenced interface.

26. The system of claim 15, wherein said means for creating comprises means for creating a list of the one or more externally referenced interfaces, said list usable in packaging the program to be run during runtime.

27. The system of claim 15, wherein said program is written in a predetermined object-oriented programming language, and wherein said one or more externally referenced interfaces comprise one or more externally referenced classes.

28. The system of claim 15, wherein the means for detecting comprises means for detecting all externally referenced interfaces in the compiled program without having to execute the compiled program during runtime.

29. A computer-implemented system of facilitating detection of externally referenced interfaces of a program, said system comprising:
 a compiled program in which one or more externally referenced interfaces in the compiled program are to be detected;
 a detector to detect the one or more externally referenced interfaces without having to execute the compiled program during runtime;
 a list of at least one of the one or more externally referenced interfaces in response to the detecting; and
 storage for storing the list.

30. The system of claim 29, wherein the detector detects all externally referenced interfaces without having to execute the compiled program during runtime.

31. At least one program storage device readable by a machine tangibly embodying at least one program of instructions executable by the machine to perform a method of facilitating detection of externally referenced interfaces of a program, said method comprising:
 obtaining a compiled program for which one or more externally referenced interfaces in the compiled program are to be detected;
 detecting the one or more externally referenced interfaces in the compiled program without having to execute the compiled program during runtime;
 creating a list of at least one of the one or more externally referenced interfaces in response to the detecting; and
 storing the list in a computer-readable medium.

32. The at least one program storage device of claim 31, wherein said compiled program comprises byte codes of said program, and wherein said detecting comprises using data of said byte codes to detect the one or more externally referenced interfaces.

33. The at least one program storage device of claim 32, wherein one or more designations of the one or more externally referenced interfaces are included in the byte codes.

34. The at least one program storage device of claim 31, wherein said compiled program comprises one or more class files of said program, and wherein said detecting comprises using data of at least one class file of said one or more class files to detect the one or more externally referenced interfaces.

35. The at least one program storage device of claim 34, wherein a class file of said at least one class file comprises one or more structures, and wherein said using comprises using data of at least one structure of the one or more structures to detect at least one externally referenced interface of the one or more externally referenced interfaces.

36. The at least one program storage device of claim 35, wherein at least one designation of the at least one externally referenced interface is located in a structure of the one or more structures.

37. The at least one program storage device of claim 35, wherein said at least one structure comprises at least one substructure, and wherein said data comprises at least one index of said at least one substructure indicating at least one other substructure of said class file that includes at least one designation of at least one externally referenced interface.

38. The at least one program storage device of claim 35, wherein a structure of said at least one structure comprises a constant pool structure, and wherein said data comprises an index of a CONSTANT_Class substructure of said constant pool structure indicating another substructure of said constant pool structure that includes at least one designation of at least one externally referenced interface.

39. The at least one program storage device of claim 35, wherein said at least one structure comprises a constant pool structure, and wherein said data comprises an index of a CONSTANT_NameAndType substructure of said constant pool structure indicating another substructure of said constant pool structure that includes at least one designation of at least one externally referenced interface.

40. The at least one program storage device of claim 35, wherein a structure of said at least one structure comprises a field_info structure, and wherein said data comprises an index of said field_info structure indicating another substructure of said class file that includes at least one designation of at least one externally referenced interface.

41. The at least one program storage device of claim 35, wherein a structure of said at least one structure comprises a method_info structure, and wherein said data comprises an index of said method_info structure indicating another substructure of said class file that includes, at least one designation of at least one externally referenced interface.

42. The at least one program storage device of claim 31, wherein said creating comprises creating a list of the one or more externally referenced interfaces, said list usable in packaging the program to be run during runtime.

43. The at least one program storage device of claim 31, wherein said program is written in a predetermined object-oriented programming language, and wherein said one or more externally referenced interfaces comprise one or more externally referenced classes.

44. The at least one program storage device of claim 31, wherein said detecting comprises detecting all externally referenced interfaces in the compiled program without having to execute the compiled program during runtime.

* * * * *